July 17, 1956 D. MANNHEIMER 2,755,383

FREQUENCY CONTROL CIRCUITS

Filed June 29, 1951 2 Sheets-Sheet 1

INVENTOR
DAVID MANNHEIMER
BY Paul B. Hunter
ATTORNEY

July 17, 1956 D. MANNHEIMER 2,755,383

FREQUENCY CONTROL CIRCUITS

Filed June 29, 1951 2 Sheets-Sheet 2

INVENTOR
DAVID MANNHEIMER
BY
Paul B. Hunter
ATTORNEY

United States Patent Office 2,755,383
Patented July 17, 1956

2,755,383

FREQUENCY CONTROL CIRCUITS

David Mannheimer, Hempstead, N. Y., assignor to Sperry Rand Corporation, a corporation of Delaware Application June 29, 1951, Serial No. 234,411

7 Claims. (Cl. 250—36)

This invention relates to automatic frequency control systems, and more particularly, to means for controlling a pair of oscillators in frequency.

It is frequently desirable to control and stabilize a pair of oscillators in frequency, for instance, in transponder type beacons. By proper choice, for example, of beacon receiver I. F. frequency, the beacon transmitting oscillator and beacon receiving local oscillator, may be operated on the same frequency and controlled by a common discriminator.

One approach is to permit one oscillator to vary independently in frequency and to apply automatic frequency control to the other oscillator with the first as a reference. However, it is not always possible to utilize this method, as the independent oscillator may drift too far in one direction and out of a required bandwidth of one or more of the other system components. For instance, in transponder type beacons, it is necessary that the transmitter oscillator remain stable in frequency and within the bandwidth of all fixed frequency receivers which are designed to receive the beacon transmissions, and also for the beacon receiving pass band to always encompass the interrogating transmission frequency.

Another possible approach to the stabilizing of two oscillators is to utilize separate discriminators and automatic frequency control to each oscillator. This solution requires undesirable duplication of circuits.

The present invention provides means for accomplishing the desired results utilizing only one discriminator. It is possible to sample the outputs of the two oscillators, apply them to a single discriminator and take separate error outputs from the discriminator and apply them to the separate oscillators. It is necessary to identify the discriminator outputs and this may be done by characteristically modulating one of the oscillators. In one embodiment of the present invention, one of the oscillators is pulse modulated and use is made of this fact to identify the separate outputs from the single discriminator.

Accordingly, a principal object of the present invention is to independently control a plurality of oscillators in frequency.

Another object of the present invention is to control a modulated and an unmodulated oscillator in frequency.

Another object of the present invention is to control microwave oscillators in frequency.

Another object of the present invention is to control a pair of oscillators in frequency, utilizing a single discriminator which provides separate outputs to each oscillator.

These and other objects will be apparent from the following specification and drawings, of which Fig. 1 is a schematic block diagram illustrative of a general system;

Figure 1:
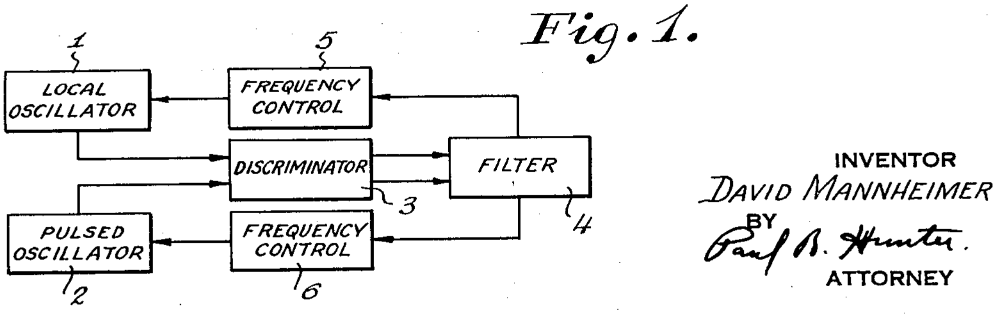

Fig. 1 illustrates in general form, one embodiment of the invention. It shows a pair of equal frequency oscillators 1 and 2, the latter of which is pulse modulated. A portion of the output of each oscillator is applied to a frequency discriminator 3 which provides two outputs, one for each oscillator. The filter circuit 4 identifies the output to be applied to each oscillator. In order to identify respective outputs, it is desirable to characteristically modulate one of the oscillators, and in the present embodiment, the oscillator 2 is pulse modulated. The separate error signals are applied to frequency control circuits 5 and 6 which are connected and adapted to regulate the frequency of the respective oscillators.

Figure 2:
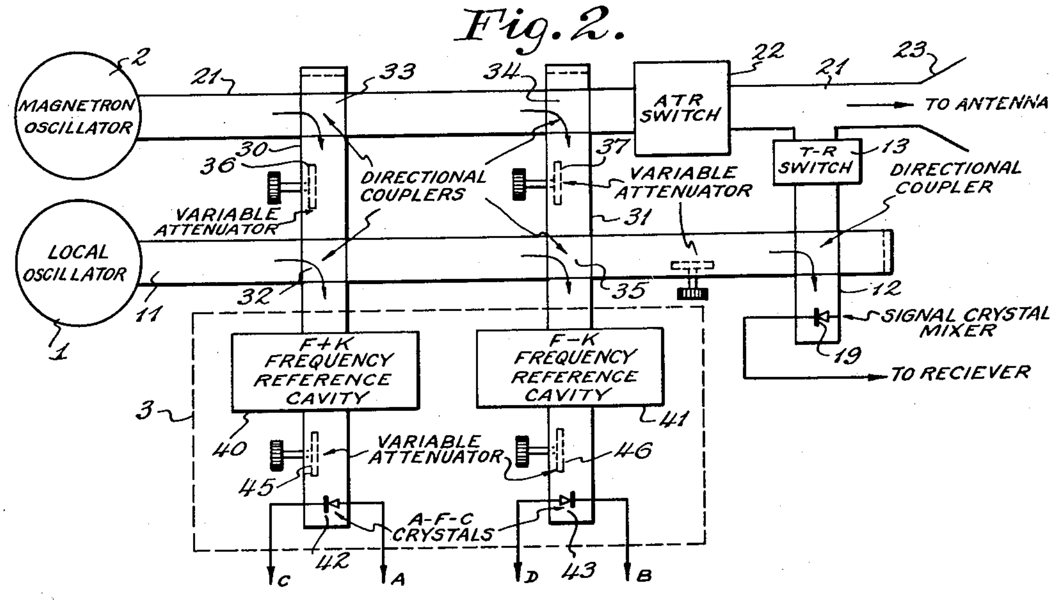
Fig. 2 is a schematic diagram of a microwave embodiment of the present invention.

Fig. 2 shows a microwave embodiment of a portion of the invention, which is adapted to be utilized as a transponder type beacon. One of the oscillators 1 may be a receiver local oscillator of the klystron type, and the other oscillator 2 may be a pulse modulated magnetron. The magnetron 2 is connected by wave guide 21 through anti-transmit-receive switch 22 to antenna 23. The local oscillator 1 is connected by wave guides 11 and 12 to the receiver mixer 19 and the intermediate frequency amplifier (not shown). The receiver is also connected by wave guide 12 through transmit-receive switch 13 and wave guide 21 to the antenna 23.

The outputs of the two oscillators are applied to the discriminator 3 by means of wave guides 30 and 31 which are preferably connected to the wave guides 11 and 21 by means of conventional directional couplers 32, 33, 34, 35. It is also desirable to insert microwave attenuators 36, 37 in the wave guide connection from the magnetron, the output signal of which is quite large. The wave guide dead ends should be suitably terminated by matched loads in conventional manner.

The discriminator 3 comprises a pair of reference resonator cavities 40 and 41, one of which is tuned to the operating frequency plus a constant frequency $(F+K)$ and the other of which is tuned to the reference frequency minus the constant frequency $(F-K)$. The outputs of the cavity resonators are applied to a pair of automatic frequency control crystals 42 and 43. Variable attenuators 45 and 46 are adapted to protect the crystals 42 and 43. This general arrangement of the discriminator is a microwave equivalent of a Travis type discriminator and has the advantage that the circuit does not depend upon precise matching of the two crystals. The reference cavities 40 and 41 may be of a commercially available type such as the 1Q24.

The discriminator circuit depends on the action of two resonant circuits, one tuned above the desired cross-over frequency and one tuned an equal amount below it. Crystal detectors 42 and 43 across the two resonant circuits are connected back-to-back and the sum of their voltages may be combined to provide the conventional desired discriminator characteristic curve. Circuits of this type are discussed in the book "Microwave Mixers" by R. V. Pound, which is vol. 16 of the Radiation Laboratory Series published by McGraw-Hill.

Figure 3:
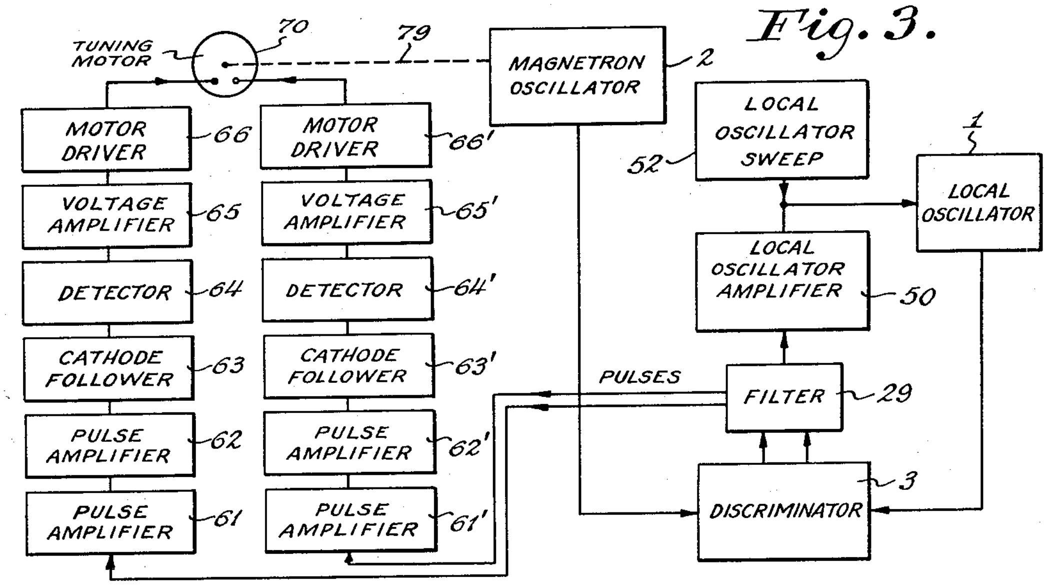
Fig. 3 is a block diagram of an embodiment of the automatic frequency control circuits of the invention.
Figure 4:
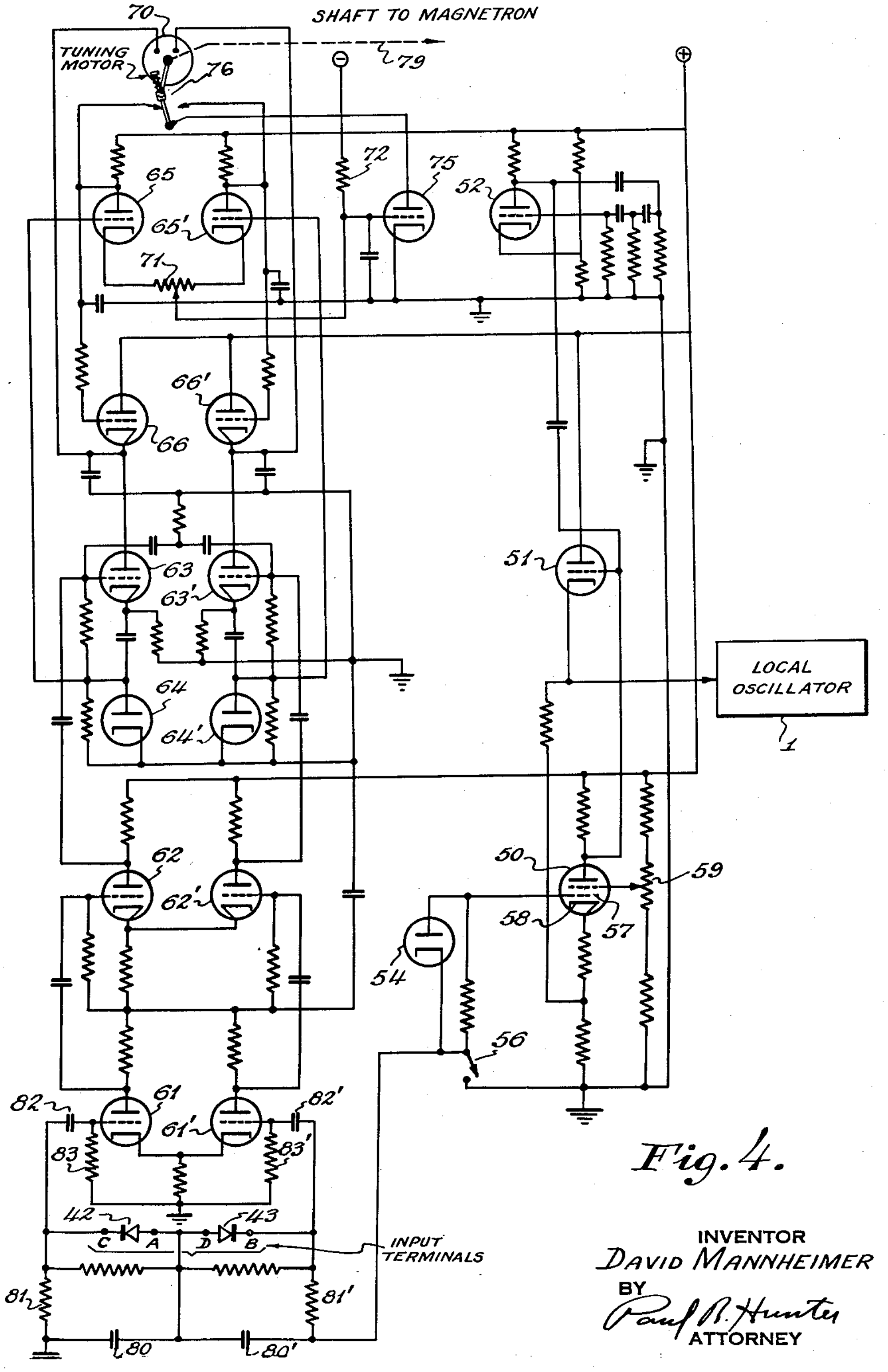
Fig. 4 is a schematic diagram of the automatic frequency control circuits of the invention.

Fig. 3 is a block diagram, and Fig. 4 is a schematic diagram of the frequency control circuits. Fig. 3 shows that the discriminator 3 output is fed separately to the local oscillator 1 control circuits, and to the magnetron oscillator 2 control circuits. Filter 29 has high and low pass sections to separate the local oscillator direct current error signal from the pulsed error signals. The local oscillator 1 control circuits comprise a local amplifier 50, the output of which is fed directly to the local oscillator 1. It may, for example, be connected to the reflector electrode if the local oscillator 1 is a klystron. Local oscillator sweep circuit 52 is also connected to the same input to the local oscillator for the purpose of sweeping the frequency into the discriminator range, if necessary, in accordance with conventional practice.

The magnetron oscillator 2 tuning circuits may comprise two parallel sets of circuits, one responsive to each crystal of the discriminator 3, since one crystal will be energized more than the other, depending upon the direction of frequency deviation. One of the crystal signals is applied to pulse amplifiers 61 and 62, then to cathode follower 63 and pulse detector 64. The detected output is supplied to voltage amplifier 65 and motor driving stage 66 which controls the tuning motor 70 and shaft 79 to thereby vary the frequency of the magnetron oscillator 2.

The other crystal is connected to a parallel line of circuits 61' to 66' for correcting frequency deviations of the opposite sense. The details of these circuits are shown in Fig. 4. Alternatively, a balanced differential pulse amplifier, pulse detector, and motor control amplifiers can be used.

Fig. 4 shows a schematic diagram of an embodiment of the frequency control circuits corresponding to Fig. 3. The input terminals to the control circuits are the four output terminals from the discriminator crystals 42, 43 of Fig. 2, respectively labelled A, B, C and D. The local oscillator 1 automatic frequency control circuit consists of an automatic frequency control amplifier 50, the cathode follower stage 51, a sweep oscillator 52, and a contact potential generator 54. A discriminator balance adjustment switch 56 is also provided.

The output of the discriminator 3 comprises a conventional D. C. error signal proportional in sense and amplitude to the local oscillator frequency error from the mean frequency of the cavity resonators. It includes also a pulsed signal proportional to the frequency deviation of the pulsed magnetron from the mean frequency of the cavity resonators. The D. C. signal is fed to the single ended amplifier 50 through a low pass filter circuit comprising condensers 80 and 80' and resistors 81 and 81'. The pulsed error signals are applied to the pulsed amplifiers 61 and 61' through the high pass filter circuits including condensers 82, 82' and resistors 83, 83'. Condenser 80 is relatively large so that the common crystal connection point A, D is effectively at high frequency ground. Therefore the magnetron control circuit is effectively balanced to ground.

The amplifier 50 has a cathode output to the local oscillator 1. If the oscillator 1 is a klystron type tube, this connection may be made to its reflector electrode. The output for zero voltage from the discriminator may be adjusted by reflector voltage adjustment 59 which varies the output voltage by varying the screen voltage of the amplifier tube 50. Therefore, the discriminator 3 will provide a correction voltage to the amplifier 50 which in turn will provide a suitable correction voltage to the oscillator 1. The function of the sweep oscillator 52 is to sweep the oscillator 1 frequency to within the control range of the discriminator 3 when the equipment is first turned on; in other words, this eliminates the necessity for initial manual tuning and is common practice. Details of this sweep oscillator circuit are disclosed in copending application Ser. No. 230,060 of Charles R. Kenny for Sweep Arrangements for Servo Systems filed June 5, 1951, now Patent No. 2,729,745. The function of the cathode follower stage 51 is to provide the necessary output impedance to the oscillator 1.

Positive feedback is obtained by returning the cathode follower 51 current to the ground through part of the cathode impedance of the amplifier 50. The direct current gain is realized from the grid 57 of stage 50 to the cathode of stage 51 at approximately 1000. With this gain, the contact potential supply by contact potential generator 54 is provided to oppose the contact potential that is generated between the grid and cathode of amplifier 50. This is desirable in order that the reflector voltage setting will not vary appreciably with heater voltage variation. The contact potential generator 54 may be a diode type tube.

The discriminator balance switch 56 is normally in the open position. When the switch is in this position, the frequency of the local oscillator 1 is stabilized. When switch 56 is in the closed position, the input circuit of the automatic frequency control amplifier 50 is grounded and the direct current discriminator voltage appears between terminal B and ground. With the input to tube 50 grounded, tube 52 oscillates sweeping the local oscillator 1 in frequency, as more fully described in the above mentioned application of Kenny.

The magnetron automatic frequency control circuits are designated so that the input voltage comprises two single ended signals which are obtained from the crystal detectors 42 and 43 and applied to the input terminals B and C of pulse amplifiers 61 and 61'. The subtraction of the crystal output voltages is delayed until after the two signals are separately amplified and detected, although other methods can be used.

Referring to Fig. 3 it will be seen that each crystal is connected to a parallel series of circuits 61 to 66 which tend to turn the magnetron tuning motor 70 in one direction or the other depending upon which crystal is energized more, which of course, is dependent upon the direction of the frequency error of the magnetron oscillator 2.

The output of crystal 43 is connected to input terminal B which is connected to pulse amplifiers 61' and 62' in series. From the second pulse amplifier 62', the pulse error signal is fed to pulse detector cathode follower 63' for proper impedance matching. The pulses are then detected in pulse detector 64' which may be a diode type detector and the output of the detector is connected to a voltage amplifier 65' which in turn is connected to the motor driver cathode follower 66'. The output of the cathode follower 66' is applied to drive the magnetron tuning motor 70 in the proper direction to correct the magnetron tuning motor 70 in the proper direction to correct the frequency. The tuning motor 70 may be a suitable direct current type motor.

The operation of the magnetron automatic control circuits may be summed as follows; depending upon the direction of magnetron frequency deviation; one of the crystal detectors is energized more than the other and the output of the crystal detectors are connected through parallel amplification and detection circuits 61 through 66 so as to energize the magnetron tuning shaft 79 in the proper direction to correct the frequency deviation. The particular method of tuning the magnetron is not within the scope of the present invention and conventional methods may be used such as are disclosed in chapter 14 of the volume "Microwave Magnetrons" which is volume 6 of the Radiation Laboratory Series, published by McGraw-Hill.

Referring to Fig. 4, pulse error voltages that appear at the grids of stages 61 and 61' are amplified by stages 61, 61' and 62, 62' and are detected in stages 63, 63' and 64, 64'. The voltages that appear at the grids of stages 65 and 65' are negative D.-C. voltages whose amplitudes are proportional to the peak amplitudes of the separate pulse error signals that appear at the grids of stages 61 and 61'. The negative D.-C. voltages are added by stages 65 and 65' in their common cathode circuit. The voltage appearing at the junction of resistors 71 and 72 becomes negative with respect to ground when pulse error signals appear. At the same time, the voltage between the plates of tubes of 65 and 65' is the amplified difference between the detected error signals applied to their grids. The result is substantially the same as that obtained using a single-ended signal derived by the subtraction of the discriminator outputs before introduction into the A. F. C. circuit.

The magnetron frequency is also automatically swept into control range as follows. The function of the negative voltage at the junction of resistors 71 and 72 derived from the error signals from each of the cavities is to disable the scanning action produced by the scanning switch tube 75 in conjunction with the scanning limit switch 76, of the positive contact or toggle type.

In the absence of error signals from the microwave detectors, the voltage appearing between the grid of tube 75 and ground is nearly zero. One of the plates of tubes 65, 65′ is connected to the pole of switch 76 and to the scanning switch tube 75. Due to its grounded cathode and essentially grounded grid, tube 75 conducts and reduces the voltage at the connected plate of tube 65 and 65′ to which tube 75 is connected. The resulting differential plate-to-plate voltage of tube 65 and 65′ causes the tuning motor to drive the magnetron tuner shaft until it shifts switch 76. This connects tube 75 to the other plate of tubes 65, 65′. The plate-to-plate voltage of tubes 65, 65′ and the sense of the tuning is reversed by the operation of switch 76. This causes rotation of the magnetron tuning shaft in the opposite direction until it shifts switch 76 back to its initial position. Thus the frequency of the magnetron is swept between fixed limits. Suitable gearing and cam arrangements for switch 76 may be made depending on the particular magnetron or other tube used.

Actually the scanning action will not continue beyond the time at which the magnetron frequency is brought near enough to frequency to produce an output from the microwave discriminator. When the frequency of the magnetron approaches the discriminator frequency range, pulse error signals appear at the cavity detector outputs. As soon as the error signals reach a sufficient amplitude to cause a stabilization of the magnetron frequency, a negative voltage appears at the junction resistors 71 and 72. This voltage reduces the conduction current of tube 75 to a negligible value, effectively removing tube 75 from the circuit. Thus the scanning action is automatically disabled with the appearance of an adequate A. F. C. error voltage. Provision may be made for rate correction in accordance with conventional servo practice.

It will be apparent that the apparatus disclosed herein is not limited to the particular embodiment shown or the particular use shown. For example, various different kinds of oscillators may be substituted for those shown and different types of discriminators may be used. Also, the invention is not limited to microwaves but the general invention may be utilized in any frequency range. The invention may be utilized wherever it is desired to control one or more frequency sources from a common discriminator.

What is claimed is:

1. Automatic frequency control apparatus comprising a pair of oscillators, one of said oscillators having a modulated output and the other oscillator having an unmodulated output, a frequency discriminator connected to the outputs of said oscillators, output means connected to said discriminator and adapted to obtain one modulated and one unmodulated output therefrom, first control means connected to said output means and responsive to said modulated output to correct the frequency of said modulated oscillator, and second control means connected to said output means and responsive to said unmodulated output to correct the frequency of said unmodulated oscillator.

2. Apparatus as in claim 1 wherein said modulated oscillator is a pulse modulated oscillator.

3. Apparatus as in claim 2 wherein said pulse modulated oscillator is a tunable magnetron.

4. Apparatus as in claim 3 wherein said unmodulated oscillator is of the velocity modulation type.

5. A pair of equal frequency oscillators, a pair of resonators, one resonator being tuned a certain amount above the frequency of said oscillators and the second resonator being tuned a substantially equal amount below the frequency of said oscillators, a pair of rectifiers each connected to the output of one of said resonators, filter means connected to the output of said rectifiers, first control means connected to said filter means and adapted to control the frequency of one of said oscillators, and second control means connected to said filter means and adapted to control said frequency of said other oscillator.

6. Apparatus as in claim 5 wherein said resonators are cavity resonators.

7. Automatic frequency control apparatus comprising a pair of oscillator circuits having nominally equal frequencies, each oscillator circuit including frequency control means responsive to an input control signal, one of the oscillator circuits including means for amplitude modulating the output of said one of the oscillator circuits at a predetermined modulation frequency to thereby provide an output distinguishably different from that of the other of said oscillators, a single discriminator coupled to the output of the oscillator circuits and responsive thereto to provide a composite control signal including two components, one of which is modulated at said modulation frequency, and filter means coupled to the output of the discriminator for separating said control signal components to produce a pair of frequency control signals respectively corresponding to said distinguishably different oscillator circuit outputs, said pair of control signals being coupled respectively to the frequency control means of the corresponding oscillator circuits.

References Cited in the file of this patent

UNITED STATES PATENTS

| | | |
|---|---|---|
| 2,245,627 | Varian | June 17, 1941 |
| 2,400,648 | Korman | May 21, 1946 |
| 2,452,575 | Kenny | Nov. 2, 1948 |
| 2,545,296 | Mittelmann | Mar. 13, 1951 |
| 2,594,263 | Munster | Apr. 22, 1952 |